United States Patent
Auer et al.

(10) Patent No.: US 6,992,595 B2
(45) Date of Patent: Jan. 31, 2006

(54) DEVICE FOR DETECTING THE POSITION OF A VEHICLE FOR A VEHICLE TREATMENT FACILITY

(75) Inventors: Robert Auer, Stadtbergen (DE); Georg Wimmer, Affing (DE)

(73) Assignee: Washtec Holding GmbH, Augsburg (DE)

( * ) Notice: Subject to any disclaimer, the term of this patent is extended or adjusted under 35 U.S.C. 154(b) by 0 days.

(21) Appl. No.: 10/893,553

(22) Filed: Jul. 15, 2004

(65) Prior Publication Data

US 2005/0057375 A1    Mar. 17, 2005

Related U.S. Application Data

(63) Continuation of application No. PCT/EP03/00918, filed on Jan. 30, 2003.

(30) Foreign Application Priority Data

Mar. 30, 2002    (DE)    ............................. 102 14 424

(51) Int. Cl.
*B60Q 1/48*    (2006.01)
(52) U.S. Cl. .................................. 340/932.2; 340/933
(58) Field of Classification Search ............ 340/932.2, 340/933, 988, 435, 436, 437; 134/123
See application file for complete search history.

(56) References Cited

U.S. PATENT DOCUMENTS

| | | | |
|---|---|---|---|
| 3,509,527 A | | 4/1970 | Oakes et al. |
| 3,596,241 A | | 7/1971 | Migneault |
| 5,226,436 A | | 7/1993 | Kirby |
| 6,147,625 A | * | 11/2000 | Decker ....................... 340/933 |
| 6,191,706 B1 | * | 2/2001 | Kositkun ................. 340/932.2 |
| 6,615,652 B1 | * | 9/2003 | Bechstein et al. ............ 73/147 |
| 6,853,313 B2 | * | 2/2005 | Newcomer ............... 340/932.2 |

FOREIGN PATENT DOCUMENTS

| | | |
|---|---|---|
| DE | 198 01 052 A1 | 8/1998 |
| DE | 198 01 052 C2 | 7/2001 |
| EP | 0 283 446 A2 | 3/1988 |
| GB | 1560890 | 2/1980 |
| WO | WO 00/50278 | 8/2000 |

* cited by examiner

*Primary Examiner*—Daryl C Pope
(74) *Attorney, Agent, or Firm*—Martin Fleit; Paul D. Bianco; Fleit Kain Gibbons Gutman Bongini & Bianco

(57) ABSTRACT

A device for detecting the position of a wheeled vehicle while driving into a vehicle treatment facility, wherein near the floor at least one electrical switching device is arranged, which is activated when it is driven over by at least one wheel of the vehicle. An evaluation unit determines from the activation of the switching unit the instantaneous position of the wheel and thus of the vehicle. The switching device is configured as a contact grid in the form of a two-dimensional matrix, especially a contact mat, with a plurality of electrical switches, wherein an electrical switch is allocated to each point of the matrix, and wherein the evaluation unit is configured so that the activation of the switches can be detected individually by the evaluation unit.

11 Claims, 1 Drawing Sheet

DEVICE FOR DETECTING THE POSITION OF A VEHICLE FOR A VEHICLE TREATMENT FACILITY

RELATED APPLICATION

This application is a continuation of International Patent Application PCT/EP03/00918 filed Jan. 30, 2003, the contents of which are here incorporated by reference in their entirety. Applicants claim the benefit of 35 USC 120.

BACKGROUND OF THE INVENTION

1. Field of the Invention

The invention relates to a device for detecting the position of a wheeled vehicle when it is driven into a vehicle treatment facility. In the sense of this invention, a vehicle treatment facility is understood to be especially a vehicle washing facility, e.g., in the form of a gantry washing facility or a drive-through car wash. However, vehicle treatment facilities can also be vehicle painting facilities, for example. In the sense of this invention, a wheeled vehicle is understood to be essentially an automobile with four wheels, of which, two wheels, one behind the other, run in the same track. However, wheeled vehicles can also be trailers or vehicles with four wheels in different tracks.

2. Prior Art

For the positioning of vehicles, especially automobiles, in front of a vehicle washing facility, there is often the problem that the driver of the vehicle to be washed does not drive the vehicle exactly in front of the entrance track of the washing facility. In a drive-through car wash, the wheels do not align with the guide, and in a gantry washing facility, the vehicle is laterally offset with respect to the center axis. This has the result that either the vehicle cannot enter in the washing facility or the gantry washing facility cannot function or it must be turned off during operation if the vehicle is laterally offset too far from the center. In addition, the vehicle can be offset not only laterally with respect to the center axis, but also diagonally in front of the automobile washing facility or in the gantry washing facility.

To assist the driver for positioning his vehicle in front of the drive-through washing facility or in the gantry washing facility, in addition to the well known wheel guidance disks and wheel reference tubes, a plurality of positioning or entry aids have also been envisioned. In the simplest case, for this purpose one or more mirrors in the field of view of the driver and directed onto the entry track are arranged in the vehicle treatment facility, as described in German Utility Model No. DE 299 12 916.0.

Furthermore, German Utility Model No. 298 09 426 shows an entry aid with a device for generating at least one optically visible guideline, which preferably runs in the center axis of the vehicle treatment facility and can be used by the driver for orientation.

In addition, a series of devices are also known from the prior art, which scan the contours of a vehicle either optically or based on ultrasound, in order to control the washing elements according to these contours. Here, examples are EP 0 283 446 A2, JP 10230821, JP 1001032, and JP 08207713. As far as these devices can optically detect the contours of the vehicle, this is preferably realized by means of light barriers or camera arrangements with subsequent image processing. All known devices are used merely to control the vehicle washing facility or the washing elements for vehicles that have been driven in, but they do not make it easier for the vehicle driver to position his vehicle correctly in the washing facility.

WO 00/50278 describes an operating method and a vehicle washing facility, which likewise provides a camera system, which optically detects the vehicle contours, and the acquired data is used in the control or regulation of system functions. In addition, this publication also uses the optical data, however, for controlling an entry aid. In this respect, the camera system is already active before the vehicle is located in its final treatment position and directional information or driving instructions are given to the driver by means of an optical display.

Although this camera arrangement offers considerable advantages relative to the prior art, it also has a few disadvantages. In particular, the vehicle approaching the system can be evaluated by optical means only by using very complicated and expensive image processing. In addition, the position of the vehicle front can be determined relatively reliably, but not a possible diagonal position of the vehicle in front of the treatment facility, which can be a result of imprudent or wrong steering maneuvers by the vehicle driver during entry. Such a diagonal position can be detected only very unreliably with all known optical sensors, whether light barriers or camera systems.

Finally, from the prior art a very simple electrical switching device for detecting the position of a single wheel of a vehicle in a washing facility is known, namely from JP 06321067. This describes a rotary plate to be driven over by the right front wheel of the vehicle to be washed. An electrical switch is connected to the shaft of this plate. Thus it can be ensured that the right front wheel will be located in at least a halfway correct washing position.

However, this publication also does not solve the problem of possible diagonal positioning. In addition, the rotary plate is used only for detecting the right longitudinal position of the vehicle and practically does not respond to a lateral offset, since, especially for vehicles with wide tires, the plate is practically always activated anyway when the longitudinal position asserts that the vehicle is not too far forward and not too far back.

Furthermore, electrical switching contact mats, which consists of a flat, flexible base material and band-shaped, pressure-sensitive switching elements distributed over the surface of the base material, are known from the prior art (cf., e.g., DE 198 01 052 C2). These switching contact mats were previously used for safety bars in order to stop, e.g., the movement of a gate when a vehicle was located in the gate region. Determination of position is not possible with these known switching contact mats.

Therefore, there is the problem of improving a device for detecting the position of a wheeled vehicle when it is driven into a vehicle treatment facility, so that lateral offset and diagonal positioning of the vehicle can also be reliably recognized.

SUMMARY OF THE INVENTION

This problem is solved by the present invention, which provides, besides the solution, novel advantageous configurations and also a novel vehicle treatment facility equipped with a corresponding device.

BRIEF DESCRIPTION OF THE DRAWINGS

One embodiment of the invention is described in more detail in the following specific description with reference to the accompanying drawing, which shows in the sole FIG. 1 a schematic top view of a detection device in front of a vehicle washing facility.

DETAILED DESCRIPTION OF PREFERRED SPECIFIC EMBODIMENTS OF THE INVENTION

Figure 1:
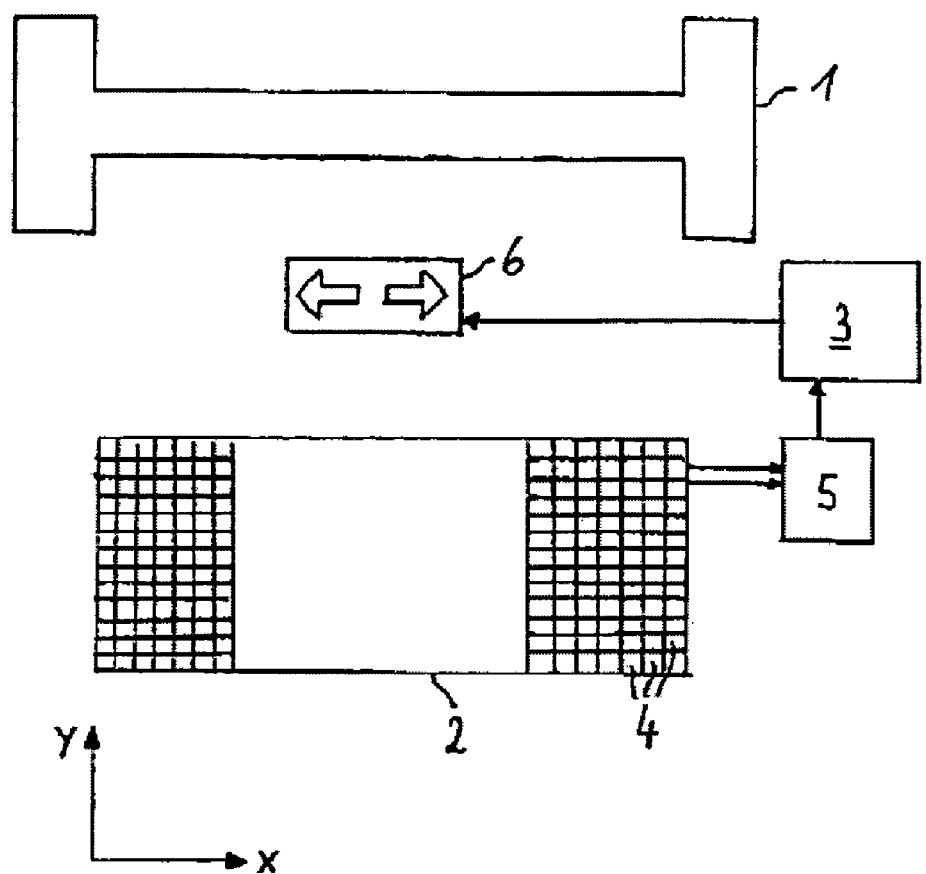

In the sole FIG. 1, the vehicle washing facility is schematically indicated by reference numeral 1. Here, the facility can be a gantry that can move in the longitudinal direction of the vehicle to be washed or it can be a fixed drive-in gantry of a drive-through car wash.

The device for detecting the position of the wheeled vehicle to be washed, which has in particular a switching device 2, is located in front of the vehicle washing facility 1 in the entry direction. This switching device 2 is a contact grid, which is configured in two parts in the shown embodiment, namely as a left contact grid and a right contact grid. The left contact grid is used for receiving the left front wheel of the vehicle to be washed while the right contact grid is used for receiving the right front wheel. There is no active zone between the two contact grids.

Both contact grids 2 consist of a plurality of electrical switches 4, which in the drawing are indicated only schematically. Each point of the shown matrix should contain an electrical switch. The electrical switches in the contact grids 2 are activated, e.g., pneumatically or mechanically.

The activation of each individual switch 4 in each contact grid 2 can be detected individually, either through completely individual control of the switch with signal wires or through known matrix evaluation, wherein each row and each column of each contact grid is connected electrically. Known details of current electrical switch contact mats are described, e.g., in DE 198 01 052 C2, whose disclosed contents are expressly referred to here.

From the contact grids 2 of the switching device, electrical lines lead to an averaging device 5, which for activation of several switches 4 of a contact grid 2 by the same wheel of the vehicle to be washed calculates the average position value, both in the X-direction and also in the Y-direction, wherein the drive-in direction of the vehicle into the washing facility 1 is calculated with the Y-direction and the direction perpendicular to the drive-in direction is calculated with the X-direction. In this way, the average point of the contact surface of each tire of the wheeled vehicle on the appropriate contact grid can be determined and thus the absolute position of the vehicle in front of the vehicle washing facility 1.

From the averaging device 5, the signal for the position of the two front wheels of the vehicle to be washed is forwarded to the evaluation unit 3, which in turn controls a display unit 6 arranged over the gantry of the vehicle washing facility 1. This display unit 6 has arrows in the illustrated embodiment 2, which can be illuminated similarly to a traffic light, wherein one arrow points left and one arrow points right. The display unit 6 is located in the field of view of the driver of the vehicle to be washed.

The described device functions as follows: As soon as a vehicle to be washed approaches the washing facility 1, its front wheels reach the contact grid 2, wherein the left front wheel activates a plurality of individual electrical switches 4 in the left region of the contact grid 2 and the right front wheel activates a plurality of electrical switches 4 in the right region of the contact grid 2. The averaging device subsequently receives the information on the switches 4 activated in the corresponding contact grids and calculates the average value of the left wheel and the right wheel from this information, separately in the X-direction and in the Y-direction. Preferably, the contact grids 2 are symmetrical in front of the entrance of the vehicle washing facility 1. Here, if the Y values of the left and right wheel agree and the X values are offset to the left or right from the center, then this means that the vehicle is too far to the left or to the right. The evaluation unit 3 then activates the display device 6, for which either the left arrow (if the vehicle is too far to the right) or the right arrow (if the vehicle is too far to the left) is illuminated. The driver can then reverse his vehicle and once again drive the vehicle forward into the correct position or simply continue to drive and correct the offset by steering until no arrow remains illuminated.

Non-agreement of the Y values of the left and right wheel means that the vehicle is diagonal to the vehicle washing facility and entry would be associated with risk of damage. In this case, a warning lamp (not shown) is lit, which indicates to the driver the diagonal positioning and asks the driver to back up and drive forward again straight into the vehicle washing facility 1.

In addition to the optical display means (arrows and warning device), acoustic display devices can also be present.

In an alternative embodiment, instead of two separate contact grids 2, a very wide contact grid 2 is used, which corresponds at least to the maximum track width of the vehicle to be washed, wherein at least two wheels in different tracks of the vehicle can activate the contact grid 2. In addition, it is possible that the length of the contact grid or of each contact grid corresponds at least to the maximum wheel base of the vehicles to be treated, wherein both the front and rear wheels can activate the contact grid simultaneously. This produces even better evaluation possibilities, especially in terms of diagonal positioning of the vehicle and its drive-in speed. However, the device is more expensive due to the greater number of necessary contact grids 2 and switches 4. If this is taken into account, however, the approach of the vehicle to the washing facility, and thus, also the longitudinal positioning of the vehicle in front of the facility can be realized by the contact grids. By evaluating the vehicle speed, a display panel with warning pointers can also be controlled, which can impart to the driver, e.g., the notice to "drive forward slowly."

For another alternative embodiment, the contact grid is formed into several individual contact strips, which are arranged in the drive-in direction and can be evaluated separately for both drive tracks (left and right wheels). This device leads to better information on the center position of the vehicle relative to the facility and thus on a possible diagonal positioning of the vehicle, especially if these contact strips are divided into four fields, which are dimensioned so that each wheel of the vehicle comes to rest on such a field.

The device according to the invention is suitable not only for a vehicle washing facility, but also for any other vehicle treatment facility, e.g., polishing, drying, or cleaning facilities. It can be used in front of a drive-through car wash or in front of a gantry washing facility with a movable gantry. A vehicle treatment facility, e.g., a gantry washing facility or a drive-through car wash, which is equipped with a detection device according to the invention, also belongs to the scope of this invention.

What is claimed is:

1. In a device for detecting the position of a wheeled vehicle while driving into a vehicle treatment facility, wherein near the floor at least one electrical switching device is arranged, which is activated when it is driven over by at least one wheel of the vehicle, with an evaluation unit, which determines from the activation of the switching unit the instantaneous position of the wheel and thus of the vehicle, the improvement characterized in that the switching device is configured as a contact grid in the form of a two-dimensional matrix, especially a contact mat, with a plurality of electrical switches, wherein an electrical switch is allocated to each point of the matrix, and wherein the evaluation unit is configured so that the activation of the switches can be detected individually by the evaluation unit.

2. Device according to claim 1, characterized in that the width of the contact grid corresponds to at least the maximum track width of the vehicles to be treated, wherein at least two wheels of the vehicle lying in different tracks can activate the contact grid.

3. Device according to claim 1, characterized in that at least two contact grids arranged next to each other approximately at the spacing of the average track width of the vehicles to be treated are provided, wherein at least two wheels of the vehicle lying in different tracks can activate the corresponding contact grid.

4. Device according to claim 2, characterized in that the length of the contact grid or each contact grid corresponds to at least the maximum wheel base of the vehicles to be treated, wherein both the front and rear wheels can activate the contact grid simultaneously.

5. Device according to claim 2, characterized in that behind the contact grid or each contact grid (2), approximately at the spacing of the maximum wheel base of the vehicles to be treated, another contact grid is arranged, whereby both the front and rear wheels can activate a contact grid simultaneously.

6. Device according to claim 1, characterized in that an averaging device, which calculates the average position value when several switches of a contact grid are activated by the same wheel and which delivers the value to the evaluation device, is assigned to each contact grid.

7. Device according to claim 1, characterized in that the contact grid is a pneumatic mat and that the electrical switches are activated indirectly by an increase in pressure in the individual pneumatic elements of the pneumatic mat.

8. Device according to claim 1, characterized in that the evaluation unit determines the longitudinal position and/or the transverse position and/or the diagonal position of the vehicle to be treated.

9. Device according to claim 1, characterized in that it has a display unit that is visible to the driver for display of the position of the vehicle as determined by the evaluation unit.

10. Vehicle treatment facility, characterized by a device according to claim 1 in its drive-in region.

11. Vehicle treatment facility according to claim 10, characterized in that it is a vehicle washing facility, especially a gantry washing facility or a drive-through car wash.

* * * * *